United States Patent Office 2,906,773
Patented Sept. 29, 1959

2,906,773

2,2'-OXYBIS(P-PHENYLENEMETHYLENE)BIS (2-THIOPSEUDOUREA) COMPOUNDS

Walter B. Trapp, Midland, Mich., assignor to The Dow Chemical Company, Midland, Mich., a corporation of Delaware No Drawing. Application August 1, 1957
Serial No. 675,573

5 Claims. (Cl. 260—465)

The present invention relates to 2,2'-[oxybis(p-phenylenemethylene)]bis(2-thiopseudourea) compounds having the formula

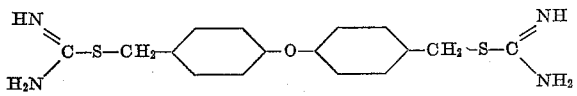

and their acid addition salts. The new compounds are crystalline solids generally of low solubility in most organic solvents and water. These new compounds are useful as parasiticides and are adapted to be employed in dust and liquid compositions for the control of many bothersome insect pests such as aphids, flies, weevils and the like. The compounds are also useful as herbicides and bactericides.

The dihydrochloride salt of the new compounds may be prepared by causing a reaction between thiourea and bis(α-chloro-p-tolyl)ether having the formula

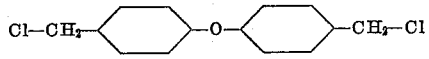

to form a 2,2'-[oxybis(p-phenylenemethylene)]-bis-(thiopseudourea) dihydrochloride having the formula

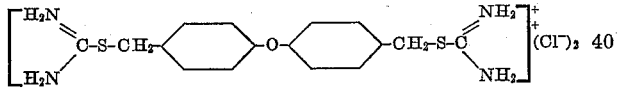

The reaction proceeds smoothly within the temperature range of from 70° to 90° C. in the presence of an inert solvent with the formation of the desired product as a crystalline solid. Good results are obtained when at least two molecular proportions of thiourea are employed for each molecular proportion of the ether.

The free amine can be recovered by treating an aqueous solution of the hydrochloride with an alkali metal or alkaline earth metal hydroxide or other suitable alkaline reacting reagent. In such operations, substantially equivalent amounts of the hydrochloride and alkali are employed. The free amine, which is substantially insoluble in water, may thereafter be separated from the reaction mixture, washed with water and dried. If desired the product may be further purified by recrystallization from suitable organic solvents.

The acid addition salts of the esters such as the hydrobromide, hydroiodide, phosphate, benzoate, sulfate, acetate, nitrate, succinate, malonate, 3-(3-cyclohexene)-2-cyanoacrylate, chloroacetate, methoxy-acetate, oxalate, adipate, salicylate, anthranilate, phthalaldehydate, melilolate, cinnamate, α-ethyl-cinnamate and other addition salts of 2,2'-[oxy-bis(p-phenylenemethylene)]bis(2-thiopseudourea) conveniently may be prepared by causing the dihydrochloride, prepared as described above, to react with an alkali metal or alkaline earth metal salt of the appropriate organic or inorganic acid in the presence of an inert solvent such as water. The nitrate may conveniently be prepared by reacting nitric acid with the hydrochloride. The reaction takes place smoothly at from 20° to 100° C. Good results are obtained when at least two equivalent proportions of the acid salts are employed for each molecular proportion of dihydrochloride.

In carrying out the reaction in accordance with the present invention, to form the dihydrochloride, the thiourea and the bis-(α-chloro-p-tolyl) ether are mixed or otherwise blended together in the presence of an inert solvent such as isopropyl alcohol, tert-butyl alcohol, mixtures of these or aqueous solutions thereof and the resulting mixture heated at the reaction temperature with gentle stirring for a period of time sufficient to complete the reaction. During the reaction the desired product precipitates in the reaction mixture. The product may be recovered in conventional manner such as by filtration or decantation. The product may be further purified by leaching with hot solvent and thereafter filtering while hot to recover the desired product as a crystalline solid.

In carrying out the conversion of the dihydrochloride prepared above to the other acid salts, the dihydrochloride is mixed or otherwise blended with an alkali metal or alkaline earth metal salt of the appropriate acid in the presence of an inert solvent such as water and at a temperature of from 20° to 100° C. The desired product precipitates in the reaction mixture during the reaction. Upon completion of the reaction, the desired product is recovered by conventional methods such as by filtration or decantation.

In the case of the nitrate the hydrochloride is reacted with nitric acid whereupon the nitrate precipitates as formed and may be removed by filtration or decantation.

In an alternative procedure for preparing the other organic and inorganic acid salts of the oxybis compound, the dihydrochloride may be neutralized with caustic or other alkali metal or alkaline earth metal hydroxide to prepare the free amine and the alkali metal or alkaline earth metal chloride. The free amine is washed free of the chloride with water, dried and reacted with appropriate acid to obtain the desired product as a crystalline solid which may be recovered by conventional manner such as by filtration or decantation.

The following examples illustrate the present invention but are not to be considered as limiting the same.

EXAMPLE 1

*2,2'-[oxybis(p-phenylenemethylene)]-bis(2-thiopseudourea)dihydrochloride*

$$\left[ NH_2\text{-}C\text{-}S\text{-}CH_2\text{-}\langle\rangle\text{-}O\text{-}\langle\rangle\text{-}CH_2\text{-}S\text{-}C\text{=}NH_2 \atop NH_2 \quad\quad\quad\quad\quad\quad\quad\quad NH_2 \right]^+ (Cl^-)_2$$

1335 grams (5 moles) of bis(α-chloro-p-tolyl)ether dissolved in a mixture of 2250 milliliters of isopropyl alcohol and 500 milliliters of tertiary butyl alcohol was heated to 78° C. to facilitate solution and thereafter filtered while hot to remove any suspended impurities. The filtrate was then added slowly to a solution of 875 grams (11.4 moles) of thiourea dissolved in a mixture of 750 milliliters of water and 1500 milliliters of isopropyl alcohol. The addition was carried out with stirring and under reflux at the boiling temperature of isopropyl alcohol. During the reaction a white crystalline solid precipitated in the reaction zone. The precipitate, a 2,2'-[oxybis(p-phenylenemethylene)]bis(2 - thiopseudourea)-dihydrochloride product, was recovered by filtration, the solid slurried with hot isopropyl alcohol (60°–70° C.), filtered while hot and dried. The product was found to melt at 234°–235° C. (decomp.).

EXAMPLE 2

*2,2'-[oxybis(p-phenylenemethylene)]bis(2-thiopseudourea)bis(3-(3-cyclohexene)-2-cyano-acrylate)*

500 milliliters of a neutral aqueous solution containing 28 grams (0.14 mole) of sodium 3-(3-cyclohexene)-2-cyanoacrylate was slowly added portionwise with stirring to 500 milliliters of an aqueous solution containing 29.2 grams (0.07 mole) of 2,2'-[oxybis(p-phenylenemethylene)]bis(2-thiopseudourea)dihydrochloride. During the reaction a white crystalline product precipitated in the reaction zone. Upon completion of the reaction, the reaction mixture was filtered to recover a 2,2'-[oxybis(p-phenylenemethylene)]bis(thiopseudourea)bis(3 - (3-cyclohexene)-2-cyanoacrylate) product as a crystalline solid. The product was recrystallized from ethanol and found to melt at 134.5°–135.5° C.

EXAMPLE 3

2,2'-[oxybis(p-phenylenemethylene)]bis(2-thiopseudourea)diacetate

In a similar manner as described in Example 2, 15 grams (0.183 mole) of sodium acetate dissolved in water was added slowly portionwise to 150 milliliters of an aqueous solution containing 10 grams (0.024 mole) of 2,2' - [oxybis(p - phenylenemethylene)]bis(2 - thiopseudourea)dihydrochloride. During the reaction a precipitate formed in the reaction mixture as a white solid. The solid was recovered by filtration to obtain a 2,2' - [oxybis(p-phenylenemethylene)]bis(2-thiopseudourea)diacetate product as a crystalline solid. The product was found to melt at 169°–169.5° C. (decomp.).

EXAMPLE 4

2,2'-[oxybis(p-phenylenemethylene)]bis(2-thiopseudourea)bis(chloroacetate)

In a similar manner as described in Example 2, 13.75 grams (0.119 mole) of sodium chloroacetate dissolved in water was added slowly portionwise to 500 milliliters of an aqueous solution containing 10 grams (0.024 mole) of 2,2' - [oxybis(p - phenylenemethylene)]bis(2-thiopseudourea)dihydrochloride. During the reaction a precipitate formed in the reaction mixture as a crystalline solid and was recovered by filtration to obtain a 2,2'-[oxybis(p - phenylenemethylene)]bis(2 - thiopseudourea) bis(chloroacetate) product as a crystalline solid. The product was found to melt at 167.5–169.5° C. (decomp.).

EXAMPLE 5

2,2'-[oxybis(p-phenylenemethylene)]bis(2-thiopseudourea)bis(methoxyacetate)

In a similar manner as described in Example 2, 17 grams (0.14 mole) of sodium methoxyacetate dissolved in water was added slowly portionwise to 500 milliliters of an aqueous solution containing 25 grams (0.06 mole) of 2,2' - [oxybis(p - phenylenemethylene)]bis(2-thiopseudourea)dihydrochloride. During the reaction, a precipitate formed in the reaction mixture and was recovered by filtration to obtain a 2,2'-[oxybis(p-phenylenemethylene)]bis(2-thiopseudourea)bis(methoxyacetate) product as a crystalline solid. The product was found to melt at 119°–120° C. (decomp.).

EXAMPLE 6

2,2'-[oxybis(p-phenylenemethylene)]bis(2-thiopseudourea)oxalate

In a similar manner as described in Example 2, 13.4 grams (0.10 mole) of sodium oxalate dissolved in water was added slowly portionwise to 500 milliliters of an aqueous solution containing 25 grams (0.06 mole) of 2,2' - [oxybis(p-phenylenemethylene)]bis(2 - thiopseudourea)dihydrochloride. During the reaction a precipitate formed in the reaction mixture and was recovered by filtration to obtain a 2,2'-[oxybis(p-phenylenemethylene)]bis(2-thiopseudourea) oxalate product as a crystalline solid. The product was found to melt at 193°–194° C. (decomp.).

EXAMPLE 7

2,2'-[oxybis(p-phenylenemethylene)]bis(2-thiopseudourea)succinate

In a similar manner as described in Example 2, 11.5 grams (0.07 mole) of sodium succinate dissolved in water was added slowly portionwise to 500 milliliters of an aqueous solution containing 25 grams (0.06 mole) of 2,2' - [oxybis(p-phenylenemethylene)]bis(2-thiopseudourea)dihydrochloride. During the addition a precipitate formed and was recovered by filtration to obtain a 2,2'-[oxybis(p-phenylenemethylene)]bis(2-thiopseudourea)succinate product as a crystalline solid. The product was found to melt at 108°–111° C. (decomp.).

EXAMPLE 8

2,2'-[oxybis(p-phenylenemethylene)]bis(2-thiopseudourea)adipate

In a similar manner as described in Example 2, 13.5 grams (0.07 mole) of sodium adipate dissolved in water was added slowly portionwise to 500 milliliters of an aqueous solution containing 25 grams (0.06 mole) of 2,2' - [oxybis(p - phenylenemethylene)]bis(2-thiopseudourea)dihydrochloride. During the addition a precipitate formed and was recovered by filtration to obtain a 2,2'-[oxybis(p-phenylenemethylene)]bis(2-thiopseudourea)adipate product as a crystalline solid. The product was found to melt at 137°–141° C. (decomp.).

EXAMPLE 9

2,2'-[oxybis(p-phenylenemethylene)]bis(2-thiopseudourea)disalicylate

In a similar manner as described in Example 2, 21 grams (0.17 mole) of sodium salicylate dissolved in water was added slowly portionwise to 500 milliliters of an aqueous solution containing 29.4 grams (0.07 mole) of 2,2' - [oxybis(p-phenylenemethylene)]bis(2-thiopseudourea)dihydrochloride. During the addition a precipitate formed and was recovered by filtration to obtain a 2,2' - [oxybis(p-phenylenemethylene)]bis(2-thiopseudourea)disalicylate product as a crystalline solid. The product was found to melt at 156°–157° C. (decomp.).

EXAMPLE 10

2,2'-[oxybis(p-phenylenemethylene)]bis(2-thiopseudourea)dianthranilate

In a similar manner as described in Example 2, 23.2 grams (0.146 mole) of sodium anthranilate dissolved in water was added slowly portionwise to 500 milliliters of an aqueous solution containing 25 grams (0.06 mole) of 2,2' - [oxybis(p-phenylenemethylene)]bis(2-thiopseudourea)dihydrochloride. The precipitate which formed during the addition was recovered to obtain a 2,2'-[oxybis(p - phenylenemethylene)]bis(2-thiopseudourea)dianthranilate product as a crystalline solid. The product was found to melt at 161°–164° C. (decomp.).

EXAMPLE 11

2,2'-[oxybis(p-phenylenemethylene)]bis(2-thiopseudourea)diphthalaldehydate

In a similar manner as described in Example 2, 24 grams (0.140 mole) of sodium phthalaldehydate dissolved in water was added slowly portionwise to 500 milliliters of an aqueous solution containing 25 grams (0.06 mole) of 2,2' - [oxybis(p-phenylenemethylene)]bis(2-thiopseudourea) dihydrochloride. The precipitate which formed during the reaction was recovered to obtain a 2,2'-[oxybis(p - phenylenemethylene)]bis(2 - thiopseudourea)diphthalaldehydate product as a crystalline solid. The product was found to melt at 100°–104° C. (decomp.).

EXAMPLE 12

2,2'-[oxybis(p-phenylenemethylene)]bis(2-thiopseudourea)dimelilotate

In a similar manner as described in Example 2, 26.6 grams (0.140 mole) of sodium melilotate dissolved in water was added slowly portionwise to 500 milliliters of an aqueous solution containing 25 grams (0.06 mole) of 2,2' - [oxybis(p-phenylenemethylene)]bis(2-thiopseudourea)dihydrochloride. The precipitate which formed during the reaction was recovered to obtain a 2,2'-[oxybis(p - phenylenemethylene)]bis(2 - thiopseudourea)dimelilotate product as a crystalline solid. The product was found to melt at 156–158° C. (decomp.).

EXAMPLE 13

2,2'-[oxybis(p-phenylenemethylene)]bis(2-thiopseudourea)dibenzoate

In a similar manner as described in Example 2, 20 grams (0.140 mole) of sodium benzoate dissolved in water was added slowly portionwise to 500 milliliters of an aqueous solution containing 25 grams (0.06 mole) of 2,2' - [oxybis(p-phenylenemethylene)]bis(2-thiopseudourea)dihydrochloride. Upon completion of the reaction a precipitate which formed during the reaction was recovered to obtain a 2,2'-oxybis(p-phenylenemethylene)bis(2-thiopseudourea)dibenzoate product as a crystalline solid. The product was found to melt at 174–176° C. (decomp.).

EXAMPLE 14

2,2'-[oxybis(p-phenylenemethylene)]bis(2-thiopseudourea)dicinnamate

In a similar manner as described in Example 2, 24 grams (0.140 mole) of sodium cinnamate dissolved in water was added slowly portionwise to 500 milliliters of an aqueous solution containing 25 grams (0.06 mole) of 2,2' - [oxybis(p-phenylenemethylene)]bis(2-thiopseudourea)dihydrochloride. Upon completion of the reaction a precipitate which formed during the reaction was recovered to obtain a 2,2'-[oxybis(p-phenylenemethylene)]bis(2-thiopseudourea)dicinnamate product as a crystalline solid. The product was found to melt at 176°–177° C.

EXAMPLE 15

2,2'-[oxybis(p-phenylenemethylene)]bis(2-thiopseudourea)bis(α-ethyl cinnamate)

In a similar manner as described in Example 2, 28 grams (0.144 mole) of sodium α-ethylcinnamate dissolved in water was added slowly portionwise to 500 milliliters of an aqueous solution containing 25 grams (0.06 mole) of 2,2' - [oxybis(p-phenylenemethylene)]bis(2-thiopseudourea)dihydrochloride. Upon completion of the reaction a precipitate which formed during the reaction was recovered to obtain a 2,2'-[oxybis(p-phenylenemethylene)]bis(2 - thiopseudourea)bis(α-ethylcinnamate) product as a crystalline solid. The product was found to melt at 158°–160° C. (decomp.).

EXAMPLE 16

2,2'-[oxybis(p-phenylenemethylene)]-bis(2-thiopseudourea)dinitrate

10 grams (0.024 mole) 2,2'-[oxybis(phenylenemethylene)]bis(2 - thiopseudourea)dihydrochloride dissolved in 200 milliliters of water was treated with 11 grams of (0.86 mole) of 50 percent nitric acid at 30°–40° C. During the addition of the nitric acid a crystalline solid precipitated in the reaction mixture. The solid was recovered by filtration to obtain a 2,2'-[oxybis(p-phenylenemethylene)]-bis(2-thiopseudourea)dinitrate product, which was found to melt at 145–150° C. (decomp.).

The new compounds have been tested and found effective as pesticides, herbicides and bactericides. For such use the product may be dispersed in an inert finely divided solid and employed as a dust. Also, such mixtures may be dispersed in water with aid of a wetting agent, and the resulting suspensions employed as sprays. In other procedures, the products may be employed as constituents of oil-in-water emulsions, or water dispersions with or without the addition of wetting, dispersing or emulsifying agents.

In a representative operation, 100 percent controls of the common house fly (*Musca domestica*) were obtained employing an aerial spray composition containing 0.24 pound of 2,2'-[oxybis(p-phenylenemethylene)] bis(2 - thiopseudourea)dihydrochloride per gallon of ultimate mixture.

In another operation, substantially complete controls of aphid (*Aphis fabae*) were obtained employing a spray composition containing 0.24 pound of 2,2'-[oxybis(p-phenylenemethylene)]bis(2 - thiopseudourea)bis(methoxyacetic acid) per gallon of ultimate mixture.

The bis(α-chloro-p-tolyl)ether employed as a starting material in accordance with the present invention may be prepared in the manner described by A. Funke et al., Comptes Rend., vol. 228, page 716 (1949). The 3-(3-cyclohexene)-2-cyanoacrylic acid employed in the instant case may be prepared in the manner of U.S. Serial No. 604,601, filed August 17, 1956 now Patent No. 2,834,800, by Walter B. Trapp and Donald E. Pledger. The sodium salt is obtained by neutralization with caustic.

I claim:

1. A 2,2' - [oxybis(p-phenylenemethylene)]bis(2-thiopseudourea)

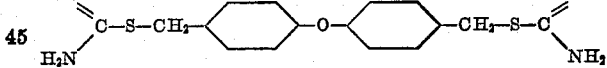

and the acid addition salts thereof.

2. 2,2' - [oxybis(p - phenylenemethylene)] - bis(2-thiopseudourea)dihydrochloride.

3. 2,2' - [oxybis(p - phenylenemethylene)]bis(2 - thiopseudourea)bis(3-(3-cyclohexene)-2-cyanoacrylate).

4. 2,2' - [oxybis(p - phenylenethylene)]bis(2 - thiopseudourea) bis(methoxyacetate).

5. 2,2' - [oxybis(p - phenylenemethylene)]bis(2-thiopseudourea) disalicylate.

References Cited in the file of this patent

UNITED STATES PATENTS

| | | |
|---|---|---|
| 2,275,379 | Johnson | Mar. 3, 1942 |
| 2,449,724 | Short et al. | Sept. 21, 1948 |
| 2,463,998 | Rohrmann | Mar. 8, 1949 |
| 2,640,079 | de Benneville | May 26, 1953 |